(12) United States Patent
Duc

(10) Patent No.: US 11,178,883 B2
(45) Date of Patent: Nov. 23, 2021

(54) DEHUMIDIFICATION METHOD AND APPARATUS

(71) Applicant: Skinny & Co., LLC, Indianapolis, IN (US)

(72) Inventor: Nguyen Tan Duc, Bolton (CA)

(73) Assignee: Skinny & Co., LLC, Indianapolis, IN (US)

( * ) Notice: Subject to any disclaimer, the term of this patent is extended or adjusted under 35 U.S.C. 154(b) by 473 days.

(21) Appl. No.: 15/005,252

(22) Filed: Jan. 25, 2016

(65) Prior Publication Data
US 2017/0020149 A1    Jan. 26, 2017

Related U.S. Application Data

(62) Division of application No. 14/303,081, filed on Jun. 12, 2014, now Pat. No. 9,560,859.

(51) Int. Cl.
*A23B 7/02*    (2006.01)
*B01D 53/26*    (2006.01)
(Continued)

(52) U.S. Cl.
CPC .......... *A23B 7/0205* (2013.01); *A23B 7/0215* (2013.01); *A23L 3/40* (2013.01);
(Continued)

(58) Field of Classification Search
CPC .. A23B 4/03; A23B 4/031; A23B 5/02; A23B 5/022; A23B 7/02; A23B 7/0205;
(Continued)

(56) References Cited

U.S. PATENT DOCUMENTS 2,172,059 A * 9/1939 Chilton .................. F26B 9/066
                                                       34/196
2,333,850 A * 11/1943 Dunkley ................. A23L 3/405
                                                       34/284
(Continued)

FOREIGN PATENT DOCUMENTS

GB          1024835 A * 4/1966 ............... A23B 7/02

OTHER PUBLICATIONS

Coconut Oil NPL, published Jan. 1, 2014, https://web.archive.org/web/20140101111938/https://www.wikihow.com/Make-Virgin-Coconut-Oil (Year: 2014).*

*Primary Examiner* — Drew E Becker
*Assistant Examiner* — Bryan Kim
(74) *Attorney, Agent, or Firm* — Reichel Stohry Dean LLP; Mark C. Reichel; Natalie J. Dean

(57) ABSTRACT

A system for dehydrating raw produce without introducing excess heat to the produce, including a first chamber for holding warm, moist air, a second chamber connected in fluidic communication with the first chamber for cooling and drying warm, moist air received from the first chamber, and a filter operationally connected between the first and second chambers for removing suspended particulates from warm, moist air flowing therethrough with a drain operationally connected to the second chamber for removing water therefrom. A third chamber is connected in fluidic communication with the second chamber for receiving cool, dry air therefrom and for receiving raw produce for drying, and a wind current generator operationally connected to the second chamber to urge cool, dry air therefrom and into the third chamber.

14 Claims, 1 Drawing Sheet

(51) Int. Cl.
  *A23L 3/40* (2006.01)
  *C11B 1/06* (2006.01)
  *B01D 46/00* (2006.01)

(52) U.S. Cl.
  CPC ....... B01D 46/0027 (2013.01); B01D 53/265 (2013.01); B01D 53/266 (2013.01); C11B 1/06 (2013.01); *A23V 2002/00* (2013.01)

(58) Field of Classification Search
  CPC ........... A23B 7/0215; A23B 9/08; A23B 7/00; A23B 7/024; A23B 7/03; A23B 7/04; A23B 7/0425; A23B 9/00; A23B 9/10; A23B 7/0053; A23B 9/005; A23B 9/02; A23B 9/025; B01D 46/0027; B01D 53/265; B01D 53/266; B01D 1/0094; A23L 3/36; A23L 3/361; A23L 3/363; A23L 3/40; A23L 19/01; A23L 19/03; A23L 19/07; A23L 11/05; A23L 11/07; A23L 19/09; F26B 3/02; F26B 3/04; F26B 3/06; F26B 3/08; F26B 3/082; F26B 3/084; F26B 9/02; F26B 9/06; F26B 9/063; F26B 9/066; F26B 21/02; F26B 21/022; F26B 21/028; C11B 1/02; C11B 1/04; C11B 1/06; C11B 1/08; C11B 1/10; C11B 1/102; C11B 1/104
  USPC ....... 426/665, 443, 465, 472, 489, 478, 384, 426/385, 444, 524; 99/473–476
  See application file for complete search history.

(56) References Cited

U.S. PATENT DOCUMENTS

| | | | | |
|---|---|---|---|---|
| 2,480,954 A | | 9/1949 | Palmer | |
| 2,531,343 A | * | 11/1950 | Patterson | A23B 5/022 159/4.01 |
| 2,559,107 A | * | 7/1951 | Bloxham | C12C 3/02 34/370 |
| 2,575,426 A | * | 11/1951 | Parnell | A23B 7/0053 131/299 |
| 3,527,646 A | * | 9/1970 | Jokay | A23B 5/06 426/289 |
| 3,824,323 A | * | 7/1974 | Harvey | A23B 7/024 426/429 |
| 3,887,716 A | * | 6/1975 | Seelbach | A23B 4/044 219/400 |
| 4,192,081 A | * | 3/1980 | Erickson | A23L 3/40 34/225 |
| 4,257,169 A | * | 3/1981 | Pierce | B65D 88/742 34/225 |
| 4,417,405 A | * | 11/1983 | Fuller, Jr. | A23B 7/022 34/120 |
| 4,468,865 A | | 9/1984 | Inagaki | |
| 4,472,887 A | | 9/1984 | Avedian et al. | |
| 4,530,167 A | * | 7/1985 | Hotovy | A23B 9/08 34/233 |
| 4,536,643 A | | 8/1985 | Erickson | |
| 4,587,132 A | * | 5/1986 | Fuller, Jr. | A23B 7/028 426/465 |
| 4,608,764 A | * | 9/1986 | Leuenberger | F26B 3/08 34/295 |
| 4,644,666 A | * | 2/1987 | Eberle | A23L 3/50 34/515 |
| 5,051,267 A | * | 9/1991 | Handl | A23B 4/031 426/231 |
| 5,616,354 A | * | 4/1997 | Tompkins | A23B 7/022 426/324 |
| 5,680,712 A | | 10/1997 | Kiyokawa et al. | |
| 6,085,442 A | * | 7/2000 | Erickson | A01J 11/04 34/197 |
| 6,195,906 B1 | | 3/2001 | Stoll | |
| 6,233,841 B1 | * | 5/2001 | Beach | A23L 3/54 34/203 |
| 6,364,948 B1 | * | 4/2002 | Austin | A23G 3/2092 118/303 |
| 7,507,869 B2 | * | 3/2009 | Cisneros | C01B 6/04 208/311 |
| 7,793,508 B2 | * | 9/2010 | Radisch | B01D 53/265 236/44 A |
| 9,044,705 B2 | * | 6/2015 | Tada | B01D 53/06 |
| 9,204,658 B2 | * | 12/2015 | Nacenta Anmella | A23B 7/02 |
| 2001/0052192 A1 | | 12/2001 | Turatti | |
| 2005/0091993 A1 | * | 5/2005 | Paradis | F24F 3/1405 62/93 |
| 2007/0240328 A1 | | 10/2007 | Moles | |
| 2011/0123698 A1 | * | 5/2011 | Meng | A23B 7/0053 426/418 |
| 2011/0252663 A1 | * | 10/2011 | Ralph | A23B 9/08 34/493 |
| 2012/0067069 A1 | * | 3/2012 | Wells | A23L 3/40 62/93 |
| 2013/0326902 A1 | | 12/2013 | Barrows | |
| 2014/0193548 A1 | * | 7/2014 | Godoy Varo | A23L 3/0155 426/231 |
| 2014/0325862 A1 | * | 11/2014 | O'Shea | F26B 21/002 34/89 |
| 2015/0298053 A1 | * | 10/2015 | Mai | B01D 53/265 426/66 |

\* cited by examiner

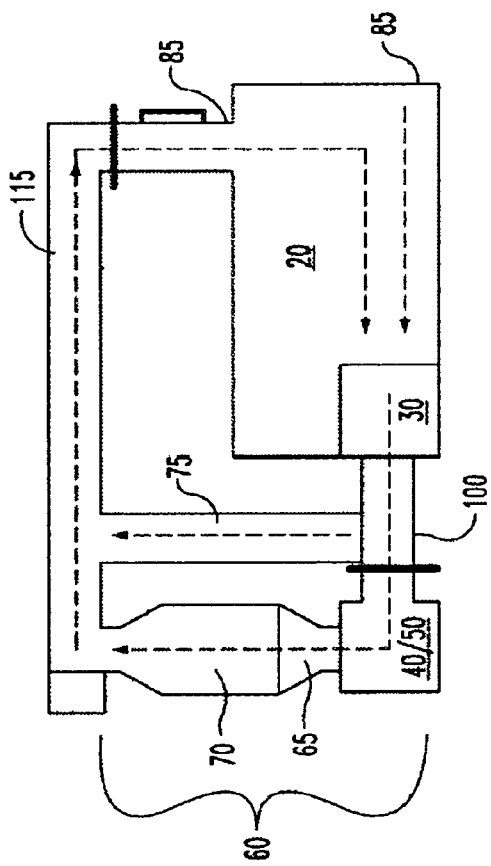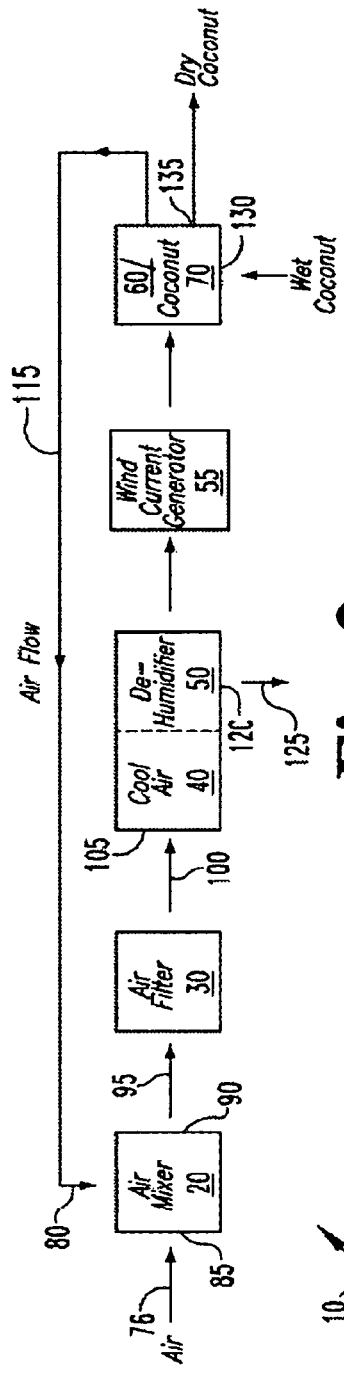

DEHUMIDIFICATION METHOD AND APPARATUS

CROSS-REFERENCE TO RELATED APPLICATIONS

This patent application is a divisional of U.S. patent application Ser. No. 14/303,081, filed on Jun. 12, 2014, now U.S. Pat. No. 9,560,859 B2, and claims priority thereto.

TECHNICAL FIELD

The present novel technology relates generally to the field of agricultural processing and, more specifically, to a method and apparatus for dehydrating harvested food products.

BACKGROUND

Various as-harvested fruits and vegetables are processed by drying the raw produce to yield a dried agricultural product. For example, grapes are dried to yield raisins, plums are dried to yield prunes, and so on. The oldest and perhaps most common method of drying produce is to set out the produce in sunlight until the produce has sufficiently dried. Using the sun as the heat source for drying produce is an energy efficient technique, but not an especially fast or reliable one.

One improvement over sun-drying has been the development of drying ovens, especially those built on a commercial scale. Such drying ovens include a heat source for directly or indirectly supplying heat or hot air to produce to quickly remove moisture therefrom. While fast and relatively efficient, these systems consume fuel to produce the heat and consequently also generate waste heat. Further, the application of heat to the produce must be carefully controlled to avoid damage from overheating.

Raw produce can be damaged from even a mild application of heat, which immediately begins to degrade vitamins, nutrients and flavor. Food products that have not been previously exposed to elevated temperatures retain their aesthetic and nutritional value, even when dried.

Current produce dehydration systems suffer from the disadvantages of high energy costs associated with generating heat for direct or indirect application to the produce. Another disadvantage is that current produce dehydration systems heat the produce in order to dehydrate it, often causing collateral damage to the produce. Another disadvantage associated with current dehydration technology is that the discharged air is known to contain pollutants, such as hydrocarbons, that are harmful to the air quality of the atmosphere. Another pollutant discharged is excess heat itself.

Thus, there is a need for an improved dehydration system for drying raw agricultural producer that reduces the generation of heat and the need for consumption of fuel to achieve the same, as well as a need for reduced expulsion of pollutants into the atmosphere. The present novel technology addresses these needs.

DESCRIPTION OF THE DRAWINGS

FIG. 1 is a first schematic perspective view of a dehydration system s according to a first embodiment of the present novel technology.

FIG. 2 is a first process control view of the system of claim 1.

DETAILED DESCRIPTION

For the purposes of promoting an understanding of the principles of the novel technology, reference will now be made to the embodiments illustrated in the drawings and specific language will be used to describe the same. It will nevertheless be understood that no limitation of the scope of the novel technology is thereby intended, such alterations and further modifications in the illustrated device, and such further applications of the principles of the novel technology as illustrated therein being contemplated as would normally occur to one skilled in the art to which the novel technology relates.

The present technology relates to the general reduction in moisture content of agricultural produce through the application of cool, dried air. FIGS. 1-2 illustrate a first embodiment of the novel technology, a system 10 for circulating and recirculating filtered, cooled, and dried air to interact with raw produce to dry the same. The system includes an air mixing chamber 20 wherein both external and recirculated air are introduced and mixed, an air filtering chamber 30 connected in fluidic communication with the air mixing chamber 20 for removal of suspended particulate matter from air flowing therethrough, an air cooling chamber 40 connected in fluidic communication with the air filtration chamber 30 for reducing the temperature of the air flowing therethrough, an air dehumidification portion 50 operationally connected to the air cooling chamber 40 for removal of water from the air flowing therethrough, a pneumatic pump or wind current generator 55 connected in fluidic communication with the air cooling and dehumidification portions 40, 50 for drawing dried air therefrom and directing the dried air into a fluidically connected produce drying chamber 60 which typically includes a grating collector portion 65 for holding produce during the drying operation and a grating filter portion 70 to separate the humidified or moisturized air from the dried produce particles. The produce drying chamber 60 is fluidically connected to the air mixing chamber 20 for recirculating humidified air thereinto.

The system 10 may further include a bypass 75 for diverting circulating air from the drying chamber 60, so that the system 10 does not have to be shut down during removal of dried produce from the drying chamber 60 and/or reloading the drying chamber 60 with fresh, wet produce to be dried.

The wind current generator 55 may be positioned at virtually any point in the system 10 so long as the wind generator 55 is in fluidic communication with the drying chamber 60, the mixing chamber 20 and the dehumidification chamber 40. The wind current generator 55 is typically a fan or air pump with sufficient throughput capacity to continuously move sufficient volumes of dried air over the wet produce and back to the dehumidification chamber 40.

The filter(s) 30 may be any convenient filter type capable of removing most or all particulates from the air flowing therethrough.

Air mixing chamber 20 receives air from both external sources 76 and recirculation sources 80 through one or more inlet port(s) 85. In some embodiments, the filter 30 is integral with the mixing chamber 20 or positioned at an outlet port 90. Alternately, the air mixing chamber 20 and the filtration portion 30 may be fluidically connected by a conduit 95, The system 10 further typically includes conduit 100 connecting cooling chamber inlet port 105 to outlet port 95. Wind current generator 55 may be fluidically connected anywhere in the system 10, typically directly in series with coolant chamber 40/dehumidification portion 50 (see FIG. 2) or in parallel therewith (see FIG. 1). Conduit 115 directs moist air from the produce drying chamber to inlet port 85.

Water is drained from air dehumidification portion 50 through port 120. Port 120 may optionally be operationally connected to a water pump 125 to redirect and flow water away from system 10 for recapture or disposal.

Raw produce is introduced into dehumidification chamber 70 through inlet port 130, which is typically closeable to form an airtight seal or partially closeable to prevent outside air from passing therethrough due to a positive pressure differential maintained inside the dehydration chamber 70. Likewise, dried produce is extracted from dehydration chamber 70 through outlet port 135, which is typically either closable to form an airtight seal or partially closable to prevent outside air from passing therethrough due to a positive pressure differential maintained inside the dehydration chamber 70.

Dehydration chamber 70 may optionally include a conveyor assembly extending through ports 130, 135 for automatic introduction and removal of produce. Dehydration chamber 70 may also include processing equipment such as oil pressing, extraction and/or collecting equipment.

In operation, recirculated air, or relatively moist air that has already been used to dry produce is directed into the mixing chamber 20 along with fresh or nonrecirculated air. The nonrecurculated fresh air is mixed with the recirculated air to yield mixed air. The blend of fresh to recirculated air may be controlled by manipulating the inlet ports 85 relative to one another.

The mixed air is filtered, typically by passing through a particulate filter 30, and the filtered air is then directed the cooling chamber 40, where it is cooled and dried. Water is removed from the cooling chamber 40, such as through a drain. The dried air is directed into the dehydration chamber 70 and introduced to raw produce placed therein, where moisture is transferred from the raw or drying produce to the dried air to yield moistened air and dried produce. As the dried air has been cooled to remove moisture therefrom, moisture is transferred to the dried air from the wet produce because the water vapor pressure gradient between the wet produce and the constantly renewed dry air is kept artificially high, favoring evaporation over condensation. Further, since evaporation is occurring at the produce surface without the introduction of excess heat, the drying process will actually cool the produce instead of heating it, as is typically the case with thermally motivated drying.

The moistened air is then recirculated into the mixing chamber 20 to define recirculated air. The dried produce may also be pressed or the like to extract oil for collection. The dried produce is ultimately collected for packaging and distribution and new raw produce is placed into the dehydration chamber 70.

Example 1

Raw, moist coconut meat is collected and placed into the dehydration chamber 70. Wind current generator 55 is energized and air is urged from the dehydration chamber 70 into the mixing chamber 20. Fresh air is likewise introduced into the mixing chamber 20, where the fresh air and recirculated air are mixed, and the mixed air is urged through filter portion 30 to remove suspended particulate matter. The filtered air is urged into the cooling chamber/dehumidifier 40, 50. Water is removed from the cooled air via condensation and conveyed from the dehumidification portion 50. The cool, dry air is urged from the dehumidification portion 50 and into the dehydration chamber 70 where it is introduced to the coconut meat. Moisture is transferred to the dry air from the coconut meat, moistening the dry air and drying the coconut meat. When the coconut meat is sufficiently dried, it is processed to remove coconut oil for collection, and the remaining coconut meat is removed from the dehydration chamber 70 and collected for packaging and sale. Fresh, raw coconut meat may then be introduced into the dehydration chamber 70 for drying.

While the invention has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the invention are desired to be protected.

I claim:

1. A method of dehydrating raw produce, comprising:
a) mixing recirculated air with non-recirculated air in a mixing chamber to yield mixed air, wherein the mixing chamber comprises:
a first inlet port that is manipulated to control the amount of recirculated air entering the mixing chamber, and
a second inlet port that is manipulated to control the amount of non-recirculated air entering the mixing chamber, the second inlet port disposed on the mixing chamber such that non-recirculated air passes through the second inlet port immediately into the mixing chamber;
b) filtering the mixed air to yield filtered air;
c) cooling the filtered air to yield cooled air;
d) drying the cooled air to yield dried air;
e) transferring moisture from the raw produce to the dried air to yield moistened air and dried produce in a produce dehydrating chamber;
f) recirculating the moistened air into the mixing chamber to define a second batch of recirculated air;
g) pressing oil from the dried produce while in the produce dehydrating chamber; and
wherein the produce is not heated during steps a) through f).

2. The method of dehydrating raw produce of claim 1 and further comprising:
h) packaging the dried produce.

3. The method of claim 1 wherein the produce is cooled during step e).

4. A method of dehydrating raw produce, comprising:
a) flowing non-recirculated air into a mixing chamber;
b) flowing recirculated air into the mixing chamber, wherein the mixing chamber comprises:
a first inlet port that is manipulated to control the amount of recirculated air entering the mixing chamber, and
a second inlet port that is manipulated to control the amount of non-recirculated air entering the mixing chamber;

c) mixing the recirculated air with the non-recirculated air in the mixing chamber to yield mixed air;
d) flowing the mixed air through a filter to yield filtered air and into an air cooling chamber;
e) cooling the filtered air in the air cooling chamber to yield cooled air;
f) extracting water from the cooled air to yield dried air;
g) flowing the dried air into a produce dehydrating chamber to transfer moisture from the raw produce to the dried air to yield moistened air and dried produce;
h) recirculating the moistened air into the mixing chamber to define a second batch of recirculated air;
i) pressing oil from the dried produce while in the produce dehydrating chamber; and
wherein the produce is not heated during steps a) through h).

5. The method of dehydrating raw produce of claim 4 and further comprising:
j) packaging the dried produce.

6. The method of claim 4 wherein the produce is cooled during step g).

7. A method of extracting moisture and oil from raw produce, comprising:
a) flowing unfiltered air through a filter and into an air cooling chamber to yield filtered air;
b) cooling and drying the filtered air in the air cooling chamber to yield cooled dry air;
c) flowing the cooled dry air into a produce dehydrating chamber to transfer moisture from the raw produce to the cooled dry air to yield moistened air and dried produce;
d) recirculating the moistened air into a mixing chamber to define recirculated air; and
e) mixing the recirculated air with external air in the mixing chamber, wherein the mixing chamber comprises:
a first inlet port that is manipulated to control the amount of recirculated air entering the mixing chamber, and
a second inlet port that is manipulated to control the amount of external air entering the mixing chamber, the second inlet port disposed on the mixing chamber such that external air passes through the second inlet port immediately into the mixing chamber;
f) diverting the mixed recirculated air and external air around the produce dehydrating chamber;
g) pressing oil from the dried produce while in the produce drying chamber; and
wherein the produce is not heated during steps a) through c).

8. The method of claim 7 wherein in step a), the unfiltered air is recirculated air.

9. The method of claim 1, wherein the first inlet port is disposed on the mixing chamber such that recirculated air passes through the first inlet port immediately into the mixing chamber.

10. The method of claim 1, wherein step f) is performed by passing the moistened air through a conduit connecting the produce dehydrating chamber and the mixing chamber.

11. The method of claim 4, wherein the first inlet port is disposed on the mixing chamber such that recirculated air passes through the first inlet port immediately into the mixing chamber and the second inlet port is disposed on the mixing chamber such that non-recirculated air passes through the second inlet port immediately into the mixing chamber.

12. The method of claim 4, wherein a conduit directs the moistened air from the produce dehydrating chamber to the first inlet port.

13. The method of claim 7, wherein the first inlet port is disposed on the mixing chamber such that recirculated air passes through the first inlet port immediately into the mixing chamber.

14. The method of claim 13, wherein a conduit directs the moistened air from the produce dehydrating chamber to the first inlet port.

* * * * *